April 14, 1931.   K. WARGA   1,800,763

METHOD OF MAKING IMITATION LEADED GLASS

Filed April 5, 1928

INVENTOR
K. Warga
BY
Sigmund Herzog
ATTORNEY

Patented Apr. 14, 1931

1,800,763

UNITED STATES PATENT OFFICE

KALMAN WARGA, OF NEW YORK, N. Y., ASSIGNOR TO WARGA INDUSTRIES, INC., OF NEW YORK, N. Y., A CORPORATION OF DELAWARE

METHOD OF MAKING IMITATION LEADED GLASS

Application filed April 5, 1928. Serial No. 267,760.

The present invention relates to improvements in a method of decorating glass surfaces, and more particularly to a method of producing imitation leaded glass.

Stained or leaded glass, such as is used in windows and also in many other articles such as lamp shades and the like, is rather expensive to make. It usually consists of a number of properly shaped and colored pieces of glass which are united, to form a window or other object of a given design, by means of leaden strips. Such leaded glass is not only difficult to produce and expensive, but it is impossible to obtain certain effects which may be procured in a design which is drawn and colored on surfaces. Furthermore, such leaded glass is apt to fall apart in case the building in which it is employed is set on fire or when the temperature in the building rises to a degree which melts the leaden strips. For this reason the use of ordinary leaded glass is prohibited in tenements or generally in buildings which are occupied as dwelling houses, mainly for the reason that, if a leaded glass window is destroyed by fire, a draught is produced which may cause fatal accidents to the members of the fire extinguishing crews.

The main object of the present invention is to obtain a method for producing leaded glass at very much less expense, and whereby certain effects are produced which it is possible to produce by drawing and coloring on surfaces, and which will not fall apart when subjected to heat.

With these and other objects in view which will more fully appear as the nature of the invention is better understood, the method consists in the several steps hereinafter recited and pointed out in the appended claims, it being understood that several changes may be made in the method within the scope of the appended claims without departing from the spirit or sacrificing any of the advantages of the invention.

A leaded glass produced in accordance with the present invention is illustrated in the accompanying drawings, in which:—

Figure 1:
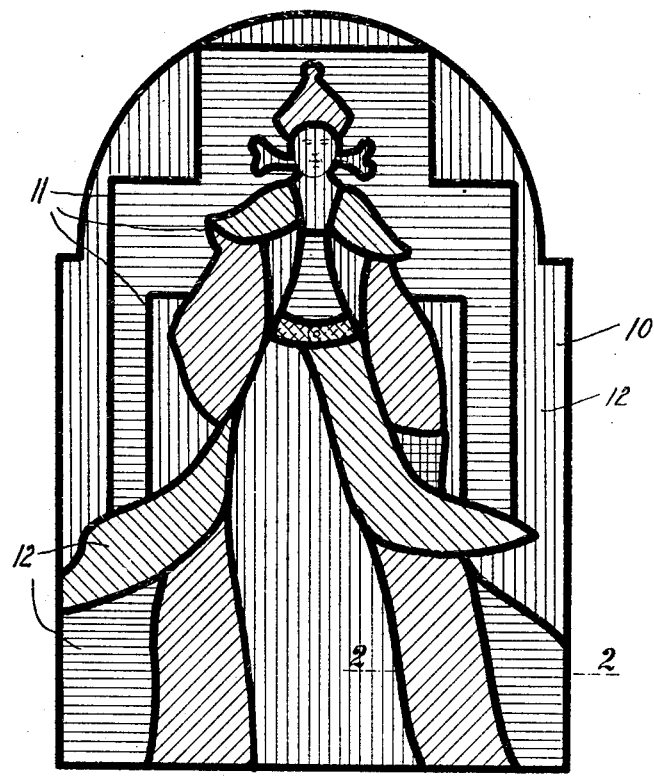
Figure 2:
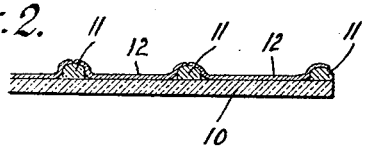

Figure 1 is a plan view of a sheet of glass provided with ornamentations produced in accordance with this invention; and Fig. 2 is a section taken on line 2—2 of Fig. 1, on a larger scale, the decorations thereon being exaggerated in thickness.

In producing leaded glass in accordance with this invention, glass of any form may be employed, such as panes of transparent glass, or articles of glass, such as for example lamp shades and the like. In the drawings, the numeral 10 indicates a glass pane of any suitable size and configuration. In carrying out the improved process, first the outlines 11 of the design, which correspond to the leading on a piece of leaded glass, are printed or painted on the pane 10 by means of a mineral color or pigment which is incorporated in or mixed with fluxes or binders of or containing vitreous material. Preferably, powdered aluminum, to which has been added a commerciably obtainable soft black mineral color, is incorporated in a flux of the character mentioned. As many stencils are then prepared as there are colors employed in producing the design, each stencil being in the form of a sheet of suitable material having cut out therefrom sections corresponding to the areas of the pane between the lines 11 which are to receive a covering of the same color. It is obvious that the several cut out portions on the several stencil sheets are not in alignment with one another, but the combined cut out portions of the several stencil sheets cover the entire area of the pane inside the lines 11.

The several colors to be applied consist each of a mineral color or pigment incorporated in or mixed with a flux or binder of or containing vitreous materials. These colors or pigments and also that of the imitation leading are each mixed with a suitable quantity of flux so as to fuse at the same temperature, or, in other words, so as to have the same melting point.

In applying the colors to the pane inside the lines 11, first one of the stencil sheets is applied to the pane with its cut out portions in proper relation to the lines 11 and the proper color applied by an air brush or the like to the pane. As appears from Fig. 2 of the drawings, the color films 12 overlap partly the lines 11, reaching, preferably, to the center line thereof. After the color films so applied are dry enough to permit of further operations, a second stencil is placed in the manner above described on the pane and a second color applied to the pane, the operation being continued until all the stencils have been made use of, that is to say until all areas inside of the lines 11 have been provided with the appropriate color films.

After the several color films have been so applied, the same may be shaded by brush or the like to increase the richness of the effect of the whole design. If the design is to contain representations of human beings, animals, flowers, etc., certain areas of the design may be obtained by printing operations, if desirable.

The pane so prepared is then placed into an oven for the purpose of fusing the design to said pane. While in the oven, the several colors or pigments melt and fuse themselves into the glass pane. The pane is then passed through a leer. Upon withdrawal from the leer, the design is found to be irremovably fixed and united with the glass pane without any running or mixing of the color films, or without any distortion of the glass object, or without any blistering or clouding of the design, and a product is obtained which not only gives the effect of a leaded glass but is free from the defects above referred to.

In order to protect the several colors or pigments from atmospheric influences, a colorless window pane is placed on top of the decorated surface of the pane 10 and united therewith in any suitable manner. Prior to placing the colorless pane on the pane 10, the decorated surface may be coated with a suitable varnish.

It is obvious that, while herein the production of an imitation leaded glass pane has been described, the invention may be applied to surfaces other than plane surfaces. Otherwise the method of producing the same is identical with that above described.

In large work, several sections of suitable size for convenient firing may be employed, and these sections may be united or secured together by metal strips of the shape of leaden strips heretofore in use, but of a material which will melt considerably above the melting point of lead.

What I claim is:—

1. The method of making imitation leaded glass which consists in first printing on a glass surface plane lines in imitation of the leaden strips of a leaded glass object, the chief ingredient of said lines consisting of a powdered siliceous substance mixed with a liquid binder and flux, then coloring the various areas of the surface intermediate said lines by successive stencil transfers, said lines and said colors each containing a mineral pigment and a vitreous binding material combined to fuse at the same temperature, and then heating said glass to irremovably fix said lines and colors to the surface of the glass at substantially the same temperature.

2. The method of making imitation leaded glass which consists in first printing on a glass surface plane colored lines in imitation of the leaden strips of a leaded glass surface, the material of said lines including powdered aluminum mixed with a mineral flux and a color binder, then applying colors to the individual areas of the surface intermediate said lines by successive stencil transfers, the coloring material of said lines and of said colors each containing a mineral pigment and a vitreous binding material combined to fuse at the same temperature, then heating said glass to irremovably fix said lines and colors to the surface of the glass at substantially the same temperature, and then cooling the glass gradually at the conclusion of the heating operation.

Signed at New York, in the county of New York, and State of New York, this 26th day of March, A. D. 1928.

KALMAN WARGA.